United States Patent [19]

Drake

[11] Patent Number: 5,128,507
[45] Date of Patent: * Jul. 7, 1992

[54] WELD CONTROL STRUCTURE FOR AND METHOD OF DELAYING INITIATION OF A WELD

[75] Inventor: Charles J. Drake, Farmington Hills, Mich.

[73] Assignee: Medar, Inc., Farmington Hills, Mich.

[*] Notice: The portion of the term of this patent subsequent to Jun. 7, 2003 has been disclaimed.

[21] Appl. No.: 575,499

[22] Filed: Jan. 30, 1984

[51] Int. Cl.⁵ .............................................. B23K 11/24
[52] U.S. Cl. .................................................... 219/110
[58] Field of Search ............. 219/108, 109, 110, 117.1

[56] References Cited

U.S. PATENT DOCUMENTS

| | | | |
|---|---|---|---|
| 4,063,075 | 12/1977 | Collom | 219/108 |
| 4,329,561 | 5/1982 | Schafer et al. | 219/110 |
| 4,456,810 | 6/1984 | Schumacher et al. | 219/110 |

Primary Examiner—Clifford C. Shaw
Attorney, Agent, or Firm—Dykema Gossett

[57] ABSTRACT

A weld control structure and method for delaying initiating a weld until the voltage of a source of welding energy is at a preselected variable value or a variable preselected number of cycles a source of welding energy have occurred without the voltage reaching the preselected value and providing a fault indication when the weld is initiated as a result of the preselected number of cycles being reached without the voltage reaching the preselected voltage. The structure includes a voltage checker for checking the voltage in each cycle of a single phase source of electrical welding energy, a counter for counting each cycle of the energy source in which the voltage is checked after a weld is requested, a fault indicator and a central processing unit programmed to initiate a weld only when the voltage of the energy source has reached the preselected value or the counter has reached the preselected count without the voltage reaching the preselected value operably connected to the voltage checker, counter, fault indicator and welder. The method includes sensing the voltage in each cycle of a single phase welding energy source and initiating a weld when the voltage reaches a predetermined variable value or initiating a weld and energizing a fault indicator when a counter for counting the cycles of the energy source in which the voltage has been checked has reached a preselected variable member of counts without the voltage reaching the preselected value.

16 Claims, 1 Drawing Sheet

WELD CONTROL STRUCTURE FOR AND METHOD OF DELAYING INITIATION OF A WELD

BACKGROUND OF THE INVENTION

1. Field of the Invention

The invention relates to weld control and refers more specifically to a resistance welding control structure and method for delaying a weld until welding voltage from a source of welding energy has reached a variable preselected value or until a variable preselected number of cycles of welding energy has been checked and the voltage thereof found to be below the preselected value, wherein if welding is initiated due to the number of cycles of welding energy checked for the preselected value, a fault indicator is energized with initiation of the weld.

2. Description of the Prior Art

It is known that for acceptable resistance welding parameters such as current and voltage of welding energy must at least have minimum values. Parameters of less than minimum values result in unacceptable welds.

Further, in production welding, it is essential that the number of welds accomplished per unit time is maximized. The time between the initiation of consecutive welds should therefore be minimized for cost effective production.

It is therefore desirable to start each weld as soon as the welding energy source provides a preselected minimum parameter value. However, if the preselected minimum parameter value is not provided within a preselected time by the source of welding energy, it is usually desirable to initiate a weld with the welding energy source having a lower than desired parameter value rather than slow production down indefinitely waiting for the welding energy source parameter to attain the minimum required value. At such times, it is also desirable to energize a fault indicator to tell a welding operator that the welding parameter is not at the preselected level.

In the past, welding controls have generally been set to provide welds at predetermined intervals without regard to the particular time when the parameters of the welding energy source reach a predetermined minimum. Such systems do not assure proper welding energy parameters when welds are initiated. In fact, the welding parameters may be worse after a predetermined interval since line loading due to other equipment on the line may be worse after a predetermined interval.

Further, such controls are not capable of load scheduling. That is to say, these controls are not capable of delaying a weld if the welding energy source is, at the time a weld is scheduled, drawn down so that the parameters thereof are below desired minimum by another welder or similar load on the welding energy source.

Further, the welding controls of the past have not provided fault indicators for indicating lower than desired welding energy parameters at the initiation of a weld following a predetermined time after a weld request during which the parameters of the welding energy source are checked.

SUMMARY OF THE INVENTION

The invention is a weld control structure and method for delaying initiation of a weld until a welding energy source parameter is at a preselected value or until a preselected number of cycles of the welding energy source have been checked without finding the parameter at a preselected value at which time welding is initiated and a fault indicator is energized.

The structure includes a voltage checker, a counter and a fault indicator interconnected through a central processing unit which are operably associated with a source of welding energy and a welder for controlling weld initiation time and providing an indication of welding energy parameter fault.

The method of the invention includes energizing the welder from the source of welding energy when a parameter of the source of welding energy is at a preselected value or energizing the welder from the source of welding energy after a predetermined number of cycles of the welding energy have been checked and the weld energy parameter found to be below the preselected value and energizing a fault indicator when the welder has been energized with the parameter at less than the preselected value.

DESCRIPTION OF THE PREFERRED EMBODIMENT

Figure 1:
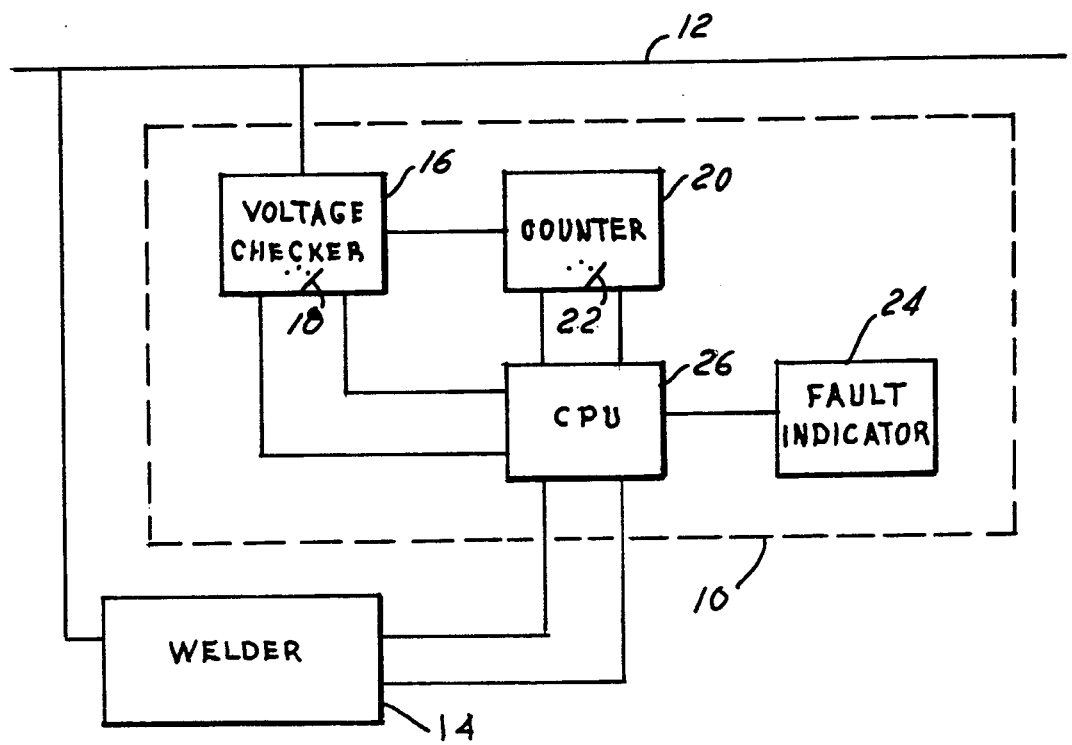
FIG. 1 is a block diagram of the weld control structure of the invention for effecting the weld control method of the invention in combination with a source of welding energy and a welder.

FIG. 1 illustrates the weld control structure 10 of the invention connected between a single phase source of electrical welding energy 12 and a resistance welder 14. For purposes of explanation of the invention, it will be assumed that the weld control structure 10 and welder 14 are one of a number of weld controls and welders utilizing the same source of welding energy 12.

As shown in FIG. 1, the weld control 10 includes a voltage checker circuit 16. The voltage checker circuit 16 is capable of checking the maximum voltage of the welding energy source during each cycle of the single phase electrical welding energy from the source of welding energy 12 after a weld is requested on actuation. A minimum desired welding voltage value to be checked for may be preselected as indicated by the variable control 18 on voltage checker 16.

The weld control 10 further includes counter 20 connected to the voltage checker. The counter 20 is operable to count the number of cycles, the maximum voltage of which has been checked by the voltage checker 16 after a weld is requested and to provide an output signal to initiate a weld when a preselected number of counts have been reached after a weld is requested without the preselected voltage being equal to or greater than the maximum voltage checked during the preselected number of counts. The preselected number of counts is variable as indicated by the control 22 on the counter 20.

The fault indicator 24 which is also part of the welding control 10 is operable on being energized to provide a fault indication such as by an indicator light, a sound signal or the like. The fault indicator is energized when the preselected number of counts has been reached by the counter without the preselected voltage being equal or greater than the maximum voltage checked during the preselected number of counts.

Figure 2:
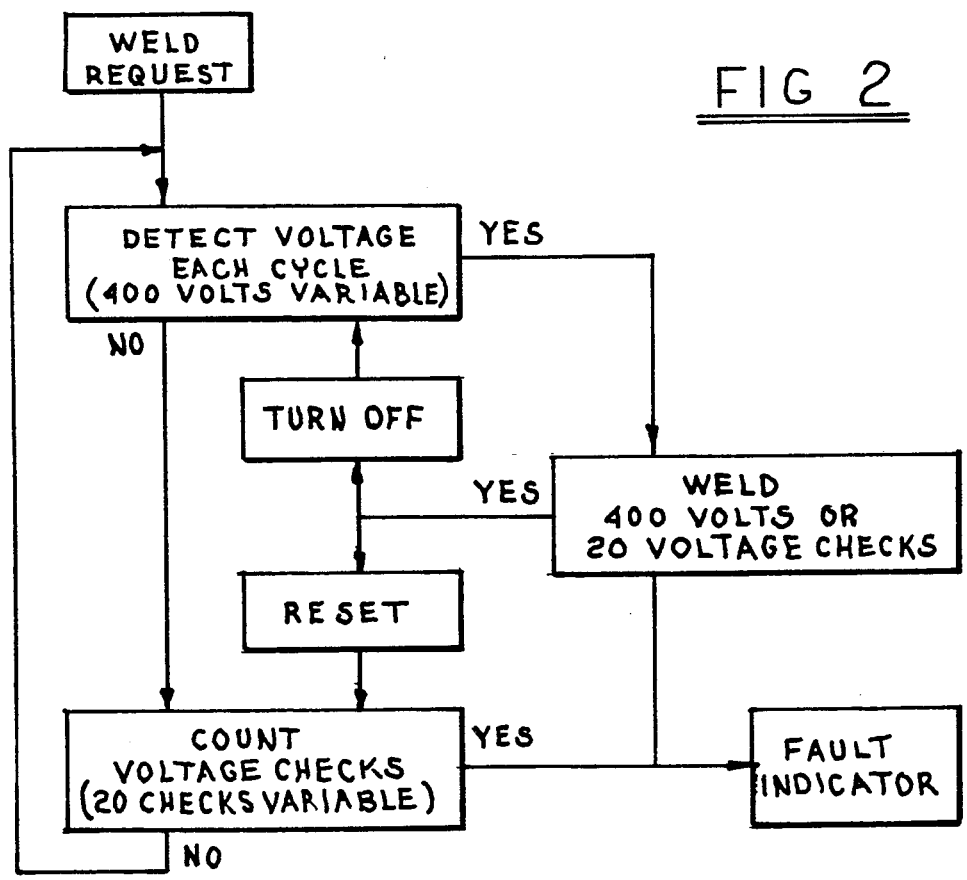
FIG. 2 is an algorithm illustrating the functioning of the weld control of FIG. 1.

As shown in FIG. 1, the voltage checker, counter and fault indicator 16, 20 and 24 are connected to the welder 14 and to each other through a central processing unit 26. The heart of the central processing unit 26 is a programmable microprocessor. The central processing unit is programmed to effectuate the algorithm shown in FIG. 2.

Thus, when a weld request signal is received by the central processing unit 26 from the welder 14 either manually or in accordance with other controls in a production welding system the voltage detector 16 is caused to start checking the maximum voltage of each subsequent cycle of welding energy of the welding energy source 12. Each voltage check after a weld request is counted by counter 20.

The central processing unit in turn sends a weld initiate signal to the welder 14 either when the voltage checked with the voltage checker 16 is at or above a preselected minimum which may be set by the variable control 18 on the voltage checker 16 or when a preselected count as determined by the setting of the count selector switch 22 on counter 20 has been attained.

If the weld initiate signal from the central processing unit has been effected due to the preselected count having been reached on the counter 22 without the voltage as checked by the voltage checker 16 reaching the preselected value, the central processing unit also energizes the fault indicator 24.

After a weld is initiate the voltage checker 16 is turned off until another weld request is received and the counter 20 is reset to start counting from 0 on another weld request being received.

Each of the voltage checker, counter and fault indicator are available as off the shelf items and/or are easily within the skill of the art to produce without experimentation. Similarly, a central processing unit 26 which may be programmed in accordance with the algorithm of FIG. 2 to effect the control indicated above, is an off the shelf item and/or may be constructed and programmed to provide the functions indicated above in accordance with the algorithm of FIG. 2 within the skill of the art. The detailed structure of these units and the specific program of the central processing unit will not therefore be considered herein in the interest of not obscuring the invention by the inclusion of non-essential details.

In accordance with the method of the invention, when it is desired to produce a weld by welder 14 which may be one of a plurality of production welders attached to the source of electrical welding energy 12, a signal is provided either from the welder 14 itself in accordance with an overall master program for the production welding system or manually by a welder operator, to the central processing unit requesting a weld initation at the earliest possible time. The voltage checker then checks the maximum voltage of each succeeding cycle of the single phase electrical energy in the source of electrical welding energy 12 and on the first cycle wherein the preselcted voltage determined by the voltage selector control 18 is recognized by the voltage checker, a weld initiation signal is provided by the central procesing unit to the welder 14.

If the voltage checker checks the number of cycles of welding energy from the welding energy source 12 selected by the control 22 of counter 20 without the minimum voltage being found in the welding energy source 12, the central processing unit will provide both a weld initiate signal to the welder 14 and will energize the fault indicator 24 which may be a light for example monitored by a welder operator.

Thus, it will be seen that each time a weld is requested at welder 14 a weld will be initiated as soon as the weld may be made with minimum desirable voltage from the source of welding energy 12. The weld will also be initiated if a selected period passes without the desired voltage for the weld being provided by energy source 12 at which time the fault indicator will be actuated to warn the welder operator that a weld has been initiated at less than minimum voltage.

It will therefore be seen that a form of load scheduling is provided by the weld control 10. Thus, if the voltage in the welding energy source 12 is low when the weld is requested at the welder 14, due to another welder effecting a weld, drawing energy from the same welding energy source 12, the weld requested at the welder 14 will not take place until the previous weld has been completed and the voltage in the welding energy source 12 built back up to the desired minimum voltage level providing only that the voltage is not below the required minimum for an excessive length of time, that is, for example, a time longer than the normal welding time and the time for the voltage to build back up in the energy source 12.

While one embodiment of the present invention has been considered in detail, it will be understood that other embodiments and modifications thereof are contemplated. It is the intention to include all embodiments and modifications as are defined by the appended claims within the scope of the invention.

I claim:

1. Weld control structure in combination with a source of single phase electrical welding energy and a resistance welder comprising, a voltage checker connected to the source of welding energy for checking the maximum value of the voltage of each cycle of the single phase source of electrical welding energy, a counter connected to the voltage checker for counting the number of cycles of the voltage which is checked and a central processing unit connected between the voltage checker and counter and the welder for receiving a weld request from the welder, initiating voltage checking for each cycle of the power source by the voltage checker and at the same time initiating counting by the counter of each cycle of voltage checked and initiating welding when either a preselected voltage has occurred at the source of electrical energy or a preselected number of counts has been counted without the preselected voltage occurring in the source of electrical energy.

2. Structure as set forth in claim 1, and further including means connected to the voltage checker for varying the preselected voltage.

3. Structure as set forth in claim 1, and further including means connected to the counter for varying the preselected number of counts.

4. Structure as set forth in claim 1, wherein the weld control structure includes a fault indicator connected to the central processing unit actuated by the central processing unit on a preselected number of cycles of the source of electrical energy being checked without the preselected voltage being detected.

5. Weld control structure for use between a welder and a source of welding energy comprising means connected to the source of welding energy for periodically checking a parameter of the welding energy available from the source of welding energy, after a weld request, means connected to the means for periodically checking a parameter of the available welding energy for delaying a requested weld until the parameter as checked during one of the periodic checks has reached a preselected value, means connected to the means for delaying a requested weld for initiating the requested weld on the parameter of the available welding energy reaching the preselected value during a single test, and means connected to the means for periodically checking a parameter of the welding energy for counting the number of checks of the welding energy parameter, said means for initiating the weld being operable on a preselected number of checks of the welding energy parameter, for initiating the weld even if the preselected parameter value of the welding energy has not been reached.

6. The method of controlling a weld comprising periodically checking a parameter of welding energy after a weld request delaying a requested weld until the parameter as checked during one of the periodic checks has reached a preselected value, counting the number of periodic checks, and initiating the weld in response to a preselected number of counts without the preselected value of the welding energy having been reached.

7. The method as set forth in claim 6, wherein the step of periodically checking a parameter of the welding energy comprises the step of periodically checking the voltage of the welding energy.

8. The method as set forth in claim 6, including the step of checking the parameter of the welding energy during each cycle of the welding energy.

9. The method as set forth in claim 6, and further including the step of varying the preselected value of the parameter checked.

10. The method as set forth in claim 6, wherein the step of initiating the weld in response to the parameter of the welding energy reaching a preselected value during one of the periodic checks comprises the step of initiating the weld when the voltage of the welding energy reaches 400 volts during one of the periodic checks.

11. Weld control structure for use between a welder and a source of welding energy comprising means connected to the source of welding for periodically checking a parameter of the welding energy after a weld request, means connected to the means for periodically checking a parameter of the welding energy for delaying a requested weld until the parameter as checked during one of the periodic checks has reached a preselected value and means connected to the means for delaying a requested weld for initiating the requested weld on the parameter of the welding energy reaching the preselected value during a single test, and further including means connected to the means for periodically checking a parameter of the welding energy for counting the number of checks of the welding energy parameter and wherein the means for initiating the weld is also connected to the means for counting the number of checks of the welding energy parameter and includes means, operable on a preselected number of checks of the welding energy parameter for initiating the requested weld even if the preselected parameter value of the welding energy has not been reached.

12. Structure as set forth in claim 11, and further including means connected to the means for counting the number of checks of the preselected parameter of the welding energy for varying the number of counts required to initiate the weld without the value of the welding energy parameter having reached the preselected value.

13. Structure as set forth in claim 11, wherein the means for initiating the weld in response to a preselected number of checks of the welding energy even if the preselected value of the parameter of the welding energy has not been reached includes means for initiating the weld after 20 checks of the parameter of the welding energy have been accomplished without the parameter having reached the preselected value.

14. The method of controlling a weld comprising periodically checking a parameter of welding energy after a weld request, delaying a requested weld until the parameter as checked during one of the periodic checks has reached a preselected value and initiating the weld in response to the value of the parameter of the welding energy reaching the preselected value during one of the periodic checks, and further, including the steps of counting the number of periodic checks and initiating the weld in response to a preselected number of counts without the preselected value of the welding energy parameter having been reached.

15. The method as set forth in claim 14, and further including the step of varying the preselected number of counts.

16. The method as set forth in claim 14, wherein the step of initiating the weld in response to a preselected number of counts without the welding energy parameter reaching the preselected value thereof comprises initiating the weld when the preselected number of counts is 20.

* * * * *